(12) United States Patent
Germain

(10) Patent No.: US 12,222,489 B2
(45) Date of Patent: Feb. 11, 2025

(54) DEVICE FOR HYPERSPECTRAL HOLOGRAPHIC MICROSCOPY BY SENSOR FUSION

(71) Applicant: LYSIA, Crepol (FR)

(72) Inventor: Gérald Germain, Crepol (FR)

(73) Assignee: CARBON BEE, Châteauneuf Sur Isère (FR)

( * ) Notice: Subject to any disclaimer, the term of this patent is extended or adjusted under 35 U.S.C. 154(b) by 854 days.

(21) Appl. No.: 17/389,669

(22) PCT Filed: Feb. 11, 2020

(86) PCT No.: PCT/EP2020/053481
§ 371 (c)(1),
(2) Date: Feb. 7, 2022

(87) PCT Pub. No.: WO2020/165176
PCT Pub. Date: Aug. 20, 2020

(65) Prior Publication Data
US 2022/0146981 A1   May 12, 2022

(30) Foreign Application Priority Data

Feb. 12, 2019   (FR) ........................ 1901367

(51) Int. Cl.
| | |
|---|---|
| G02B 21/36 | (2006.01) |
| G02B 21/00 | (2006.01) |
| G03H 1/00 | (2006.01) |
| G03H 1/04 | (2006.01) |
| G03H 1/08 | (2006.01) |

(Continued)

(52) U.S. Cl.
CPC ....... *G02B 21/367* (2013.01); *G02B 21/0064* (2013.01); *G03H 1/0005* (2013.01); *G03H 1/0443* (2013.01); *G03H 1/0866* (2013.01); *G06N 3/04* (2013.01); *G06V 10/803* (2022.01); *G06V 10/82* (2022.01); *G06V 20/693* (2022.01);

(Continued)

(58) Field of Classification Search
None
See application file for complete search history.

(56) References Cited

U.S. PATENT DOCUMENTS

2018/0292784 A1   10/2018  Nguyen et al.

FOREIGN PATENT DOCUMENTS

WO    2019154765 A1   8/2019

OTHER PUBLICATIONS

Andreas Eitel & Jost Springenberg et. al., Multimodal Deep Learning for Robust RGB-D Object Recognition, International Conference on Intelligent Robots and Systems (IROS), Oct. 2, 2015, 681-687, Congress Center Hamburg, Hamburg, Germany.

(Continued)

*Primary Examiner* — Robert E. Tallman
(74) *Attorney, Agent, or Firm* — IP Attorneys Group, LLC

(57) ABSTRACT

The invention concerns a device for the holographic and hyperspectral measurement and analysis (2) of a sample (3), comprising; —an acquisition means (2) for acquiring a diffracted image (11) of an image of the sample (3); and interference patterns (12) of a reference light signal (R) and the light signal (O) having passed through the sample (3) to be measured and analysed; and —a means for illuminating the sample (3) focused on the sample (3); and —a means for reconstructing and analysing (1) the hyperspectral holographic image comprising a deep convolutional neural network generating an image for analysis and detection of particularities in the sample.

19 Claims, 11 Drawing Sheets

(51) Int. Cl.
  *G06N 3/04* (2023.01)
  *G06V 10/80* (2022.01)
  *G06V 10/82* (2022.01)
  *G06V 20/69* (2022.01)
  *G06V 10/141* (2022.01)

(52) U.S. Cl.
  CPC ..... *G03H 2001/005* (2013.01); *G06V 10/141* (2022.01)

(56) References Cited

OTHER PUBLICATIONS

Ling Wei & Elijah Roberts, Neural Network Control of Focal Position During Time-lapse Microscopy of Cells, bioRxiv, Dec. 13, 2017, 1-22, Johns Hopkins University, Baltimore, Maryland, United States.

Michael Descour, Non-scanning Imaging Spectrometry, A Dissertation Submitted to the Faculty of the Committee on Optical Sciences, 1994, 1-152, University of Arizona, Tucson, Arizona, United States.

Nathen Hagen & Michael Kudenov, Review of Snapshot Spectral Imaging Technologies, Optical Engineering, Sep. 23, 2023, 1-23, vol. 52(9), SPIE, United States.

Patrice Tankam, Methodes D'holographie Numerique Couleur Pour La Metrologie Sans Contact En Acoustique Et Mecanique, Dissertation, Oct. 12, 2010, 1-238, University of Le Mans, Le Mans, France.

H. Bourlard & Y. Kamp, Auto-Association by Multilayer Perceptrons and Singular Value Decomposition, Biological Cybernetics, 1988, 1-4, Philips Research Laboratory, Brussels, Belgium.

Joao Maria & Joao Amaro et. al., Stacked Autoencoders Using Low-power Accelerated Architectures for Object Recognition in Autonomous Systems, 1-15, Portugal.

Vijay Badrinarayanan & Alex Kendall et. al., SegNet: A Deep Convolutional Encoder-Decoder Architecture for Image Segmentation, IEEE Transactions On Pattern Analysis And Machine Intelligence, Jan. 1, 2017, 2481-2495, vol. 39(12), IEEE, United States.

Michael Descour & Eustace Dereniak, Computed-tomography Imaging Spectrometer: Experimental Calibration and Reconstruction Results, Applied Optics, Aug. 1, 1995, 4817-4826, vol. 34(22), Optical Society of America, United States.

Ralf Habel & Michael Kudenov et al., Practical Spectral Photography, Eurographics, 2012, 449-458, vol. 31 (12), Blackwell Publishing, Malden, Massachusetts, United States.

Sergey Ioffe & Christian Szegedy, Batch Normalization: Accelerating Deep Network Training by Reducing Internal Covariate Shift, arXiv.org, Mar. 2, 2015, 1-11, Cornell University, Ithaca, New York, United States.

Yuxin Wu & Kaiming He, Group Normalization, arXiv.org, Jun. 11, 2018, 1-10, Cornell University, Ithaca, New York, United States.

DEVICE FOR HYPERSPECTRAL HOLOGRAPHIC MICROSCOPY BY SENSOR FUSION

TECHNICAL FIELD

The present invention relates to a microscopy device for analyzing a sample.

PRIOR ART

Different methods of compressing the image of a hyperspectral scene are described in the literature.

The object of these methods is to acquire the image of the hyperspectral scene in a single acquisition without the need to scan the scene in spatial or spectral dimensions.

For example, the thesis "Non-scanning imaging spectrometry", Descour, Michael Robert, 1994, The university of Arizona, proposes a way of acquiring a single two-dimensional image of the observed scene containing all the information on the influence of different wavelengths.

This method, called CTIS (for "Computed-Tomography Imaging Spectrometer"), proposes to capture a compressed image of the observed scene by means of a diffraction grating arranged upstream of a digital sensor. This compressed image acquired by the digital sensor takes the form of multiple projections for which each projection makes it possible to represent the image of the observed scene and contains all the spectral information of the scene.

This method, although satisfactory for solving the problem of instantaneous acquisition of the hyperspectral scene, requires complex algorithms which are costly in computing resources in order to estimate the uncompressed hyperspectral scene in three dimensions. The publication "Review of snapshot spectral imaging technologies", Nathan Hagen, Michael W. Kudenov, Optical Engineering 52 (9), September 2013, presents a comparison of hyperspectral acquisition methods as well as the algorithmic complexities associated with each of them.

Indeed, the CTIS method requires an estimation process based on a two-dimensional matrix representing the transfer function of the diffraction optics. This matrix must be inverted to reconstruct the three-dimensional hyperspectral image. As the transfer function matrix is not completely defined, iterative matrix inversion methods which are costly in computing resources make it possible to approach the result step by step.

In addition, the three-dimensional hyperspectral image reconstructed by these calculation methods does not contain additional spatial or spectral information compared to the compressed two-dimensional image obtained by these acquisition methods. The estimation by the calculation of the hyperspectral image in three dimensions is therefore not necessary for a direct detection of the particularities sought in the scene.

Holography was invented in 1947 by Dennis Gabor. Since then, various improvements have been made to the process. In particular, digital holography, the foundations of which were laid in 1967 by Goodman, brings the possibility of processing and reconstructing holograms from a digital acquisition of interference figures. Yamaguchi introduced digital color holography in 2002, allowing acquisition and reconstruction of the hologram taking into account the colors of the object. Various improvements have been proposed since. For example, the thesis «Méthodes d'holographie numérique couleur pour la métrologie sans contact en acoustique et mécanique» ("Digital color holography methods for non-contact metrology in acoustics and mechanics"), Patrice Tankam, 2011, presents various state-of-the-art processes for digitally acquiring a color hologram and reconstituting it.

These methods do not offer the possibility of acquiring and reconstructing a hyperspectral hologram of the observed object. Likewise, the methods of reconstructing the hologram from the acquisition of interference figures of object and reference rays, based on the Fresnel transform, require calculations expensive in computational and memory resources.

Methods of image processing for the purpose of detecting features are widely described in the scientific literature. For example a method based on neural networks is described in "auto-association by multilayer perceptrons and singular value decomposition». Biological cybernetics, 59 (4): 291-294, 1988. ISSN 0340-1200, H. Bourlard and Y. Kamp. AT.

New methods based on deep convolutional neural networks are also widely used with results showing very low false detection rates. For example, such a method is described in "Stacked Autoencoders Using Low-Power Accelerated Architectures for Object Recognition in Autonomous Systems", Neural Processing Letters, vol. 43, no. 2, pp. 445-458, 2016, J. Maria, J. Amaro, G. Falcao, L. A. Alexandre.

These methods are particularly suitable for detecting elements in a color image; generally having 3 channels—Red, Green and Blue; of a scene by taking into account the characteristics of shapes, textures and colors of the feature to be detected. These methods consider the image homogeneous, and process by convolution the entire image by the same process.

The processing of the two-dimensional compressed images obtained by the CTIS method cannot therefore be operated by means of a standard deep and convolutional neural network. Indeed, the images obtained by these methods are not homogeneous, and contain nonlinear features in either spectral or spatial dimensions.

DISCLOSURE OF THE INVENTION

The present invention proposes to directly detect the particularities sought in a sample by means of a formal, deep and convolutional neural network, the architecture of which is adapted to a fusion of information and direct detection, applied to a hologram of the a sample containing the phase and amplitude information of the sample and a compressed and two-dimensional image of the light passing through the sample containing the spectral information of the image of said sample.

According to one embodiment, the hologram and compressed images of the sample are thus merged by means of said formal, deep and convolutional neural network and a direct detection of said desired features is made from the information merged by means of this same formal neural network, deep and convolutional.

To this end, the invention relates to a device for holographic and hyperspectral measuring and analyzing a sample, said device comprising:
  an acquisition device for acquiring an image of the sample containing spectral and amplitude information of the light signal illuminating said sample and holographic interference figures of a reference light beam and of a light beam having illuminated said sample containing the amplitude and phase information of the light signal illuminating said sample; and
  an illumination device of said sample; and a device for reconstructing the hyperspectral holographic image and for analyzing the amplitude, phase and spectrum properties of the light illuminating said sample, integrating a deep and convolutional neural network architectured to calculate a probability of presence of the one or more particularities sought in said sample from the hyperspectral holographic image and generating an image for each sought particularity, the value of each pixel at the coordinates x and y corresponding to the probability of presence of said particularity at the same x and y coordinates of the image of said sample.

According to one embodiment, the acquisition device comprises on the one hand a device for acquiring a compressed image of the sample containing said spectral and amplitude information of the illuminating light signal, in particular passing through or reflected by the sample, and on the other hand a device for acquiring an image of said holographic interference figures, in which the neural network is designed to calculate the probability of the presence of the particularities sought in said sample from the compressed image and the figure of holographic interference of the reference beam with the illuminating beam, in particular passing through or reflected by the sample, said deep and convolutional neural network being architectured so as to merge the information from the sensors of the diffracted image and of the image of the holographic interference figure.

According to this embodiment, the invention is based on a holographic sensor measuring the light having passed through the sample to be analyzed and a sensor using a method of diffraction of the light having passed through the sample, and an information processing configured in order to merge the holographic and compressed images and to detect the particularities sought in the sample.

An embodiment using reflection is also envisaged.

According to one embodiment, the present invention uses the hologram and the compressed image of the same hyperspectral scene. A deep convolutional neural network image fusion method is presented in "Multimodal deep learning for robust rgb-d object recognition. In Intelligent Robots and Systems (IROS)", Eitel, A., Springenberg, J. T., Spinello, L., Riedmiller, M., and Burgard, W. (2015) IEEE/RSJ International Conférence on, pages 681 #687. IEEE. This document presents a deep and convolutional neural network structure using two processing paths, one path per image type of the same scene, completed by layers merging the two paths; the function implemented by this deep and convolutional neural network is a classification of images. This structure is not suitable as it is for this embodiment of the present invention, since it is not suitable for two-dimensional compressed images of a three-dimensional hyperspectral scene, and having the function of classifying the scene and not detection of particularities in this scene.

This embodiment of the invention makes it possible to measure and analyze a sample from a holographic image acquired from light passing through the sample; image containing all spatial and phase information; and a compressed image, a compressed, non-homogeneous and non-linear two-dimensional representation containing all the spatial and spectral information of the light having passed through said sample by means of a convolutional neural network merging this information. An embodiment using reflection is also envisaged.

The invention finds a particularly advantageous application for systems intended to analyze samples by detecting features from their shape, texture, phase and transmittance spectrum.

The invention can be applied to a large number of technical fields in which hyperspectral holographic microscopic analysis is sought. In a non-exhaustive manner, the invention can be used, for example, in the medical and dental field, to aid in the diagnosis by detecting in particular the presence of bacteria, cells or molecules in a sample. In the field of chemical analysis, the invention can also be used to measure concentrations. In the field of biology, the invention can be used to detect the presence of bacteria, cells, spores, or organic molecules.

For the purposes of the invention, a hyperspectral holographic microscopy corresponds to a device detecting particularities in the image of a sample directly from an optical system acquiring a microscopic hologram of the sample, containing the phase and amplitude information of the image of the sample and an acquisition of a compressed image containing the spatial and spectral information of the sample.

According to one embodiment, the illumination device for illuminating said sample comprises a collimated light source configured to generate a light beam, the acquisition device for acquiring said diffracted image and said image of holographic interference figures comprises:

a first semi-reflecting mirror separating the light beam from said light source into two light beams; a first beam, object beam, passing through the sample and a second beam, reference beam, towards a second reflecting mirror; and the second reflecting mirror directing said reference light beam towards a third semi-reflecting mirror; and the third semi-reflecting mirror, adding said reference beam with said object beam and transmitted in the direction of a chromatic filter; and an area in which said sample can be positioned so as to be traversed by said object light beam; and a fourth semi-reflecting mirror, separating said object beam coming from the area in which said sample can be positioned into two beams: a third beam being transmitted towards the third semi-reflecting mirror and a fourth beam being transmitted towards a first converging lens; and the first converging lens configured to image said sample (illuminated by said object beam) at an opening; and a collimator configured to pick up the beam passing through said opening and to transmit this beam on a diffraction grating; and a second converging lens configured to focus the rays coming from the diffraction grating on a capture surface, the chromatic filter configured to filter the wavelengths of said object and reference beams, added and interfered into a hologram on the third semi-reflective mirror; and a third converging lens configured to focus the hologram rays coming from the chromatic filter on a capture surface.

This embodiment is particularly simple to achieve.

According to one embodiment, the acquisition device comprises a single device for acquiring a compressed image of the holographic interference figures of the sample.

According to this embodiment, the illumination device for illuminating said sample comprises a collimated light source configured to generate a light beam, and the acquisition device comprises:

a first semi-reflecting mirror separating the light beam from said light source into two light beams: a first beam, object beam, illuminating the sample and a second beam, reference beam; and an area in which said sample can be positioned so as to be imaged by said object light beam; and a system of mirrors adapted to have the object and reference beams interfere, a first converging lens configured to image said hologram of the sample on an opening; and a collimator configured to pick up the beam passing through said opening and to transmit this beam on a diffraction grating; and a second converging lens configured to focus the rays coming from the diffraction grating on a capture surface.

According to one embodiment, said illumination device is obtained by a light source comprising:

a first source of white, multi-chromatic and non-coherent light; and a first converging lens configured to collimate light rays from said first source of white, multi-chromatic and non-coherent light; and a second source of mono-chromatic and coherent light; and a beam expanding optical system configured to extend and collimate light rays from said second mono-chromatic and coherent light source; and a third converging lens configured to collimate light rays from said second diverging lens; and a prism configured to add the light rays coming from said mono-chromatic and coherent light source and the light rays coming from said white, multi-chromatic and non-coherent light source in a light beam.

This embodiment is particularly simple to achieve.

According to one embodiment, said holographic interference figure is obtained by an infrared sensor. This embodiment makes it possible to obtain information that is invisible to the human eye.

According to one embodiment, said holographic interference figure is obtained by a sensor whose wavelength is between 300 nanometers and 2000 nanometers. This embodiment makes it possible to obtain information in the domains visible and invisible to the human eye.

According to one embodiment, said compressed image is obtained by an infrared sensor. This embodiment makes it possible to obtain information that is invisible to the human eye.

According to one embodiment, said compressed image is obtained by a sensor whose wavelength is between 300 nanometers and 2000 nanometers. This embodiment makes it possible to obtain information in the domains visible and invisible to the human eye.

According to one embodiment, said particularity sought in said sample is the presence of a kind and a species of bacteria in a sample of saliva, dental tartar sample, nasal secretions, blood or urine containing a set of bacteria of different kinds and different species. This embodiment makes it possible to detect certain bacteria indicative of diseases or syndromes for the purpose of aid in diagnosis.

According to one embodiment, said particularity sought in said sample is the presence of a molecule or of a set of molecules exhibiting a particular transmittance in the light spectrum concerned by the analysis. This embodiment makes it possible to detect certain molecules indicative of diseases or syndromes for the purpose of assisting in diagnosis.

According to one embodiment, said particularity sought in said sample is the presence of gametes in a sperm sample. This embodiment makes it possible to count the gametes present in a sample for the purpose of aid in diagnosis.

According to another aspect, the invention relates to a method for measuring and analyzing a holographic and hyperspectral sample, said method comprising:

an illumination device illuminates said sample; and an acquisition device acquires an image containing the spectral and amplitude information of the light signal illuminating said sample; and holographic interference figures of a reference light beam and a light beam having illuminated said sample containing the amplitude and phase information of the light signal illuminating said sample; and a device for reconstructing the hyperspectral holographic image and analyzing the amplitude, phase and spectrum properties of the light illuminating said sample integrates a deep and convolutional neural network architectured to calculate a probability of the presence of the one or more particularities sought in said sample from the hyperspectral holographic image, and generate an image for each sought particularity whose value of each pixel at the coordinates x and y corresponds to the probability of the presence of said particularity at the same coordinates x and y of said sample In another aspect, the invention relates to a computer program comprising instructions which cause a processor to perform such a method.

As regards the detection of particularities from said holographic and compressed images, the invention uses a deep and convolutional neural network for determining the probabilities of the presence of these features. Learning of said deep and convolutional neural network makes it possible to indicate the probability of presence of the particularities sought for each x and y coordinates of the image of said sample. For example, learning by backpropagation of the gradient or its derivatives from training data can be used.

The deep convolutional neural network for direct detection from said holographic image and said compressed image has an input layer structure suitable for direct detection. The invention has several architectures of the deep layers of said neural network. Among this, an auto-encoder architecture as described in the document "SegNet: A Deep Convolutional Encoder-Decoder Architecture for Image Segmentation", Vijay Badrinarayanan, Alex Kendall, Roberto Cipolla makes it possible to indicate the probability of the presence of the particularities sought for each x and y coordinates of the image of said sample. In addition, the document "Multimodal deep learning for robust rgb-d object recognition. In Intelligent Robots and Systems (IROS)", Eitel, A., Springenberg, J. T., Spinello, L., Riedmiller, M., and Burgard, W. (2015) IEEE/RSJ International Conference on, pages 681 #687. IEEE, describes a convolutional neural network architecture suitable for processing different images of the same scene.

Said input layers of the neural network are adapted so as to be filled with the data of said holographic image and said compressed image obtained by the acquisition device. Thus, each input layer of the different image processing paths is a tensor of order three and has two spatial dimensions of size XMAX and YMAX, and a depth dimension of size DMAX.

The invention uses the nonlinear relation $f(x_t, y_t, d_t) \rightarrow (x_{img}, y_{img})$ defined for $x_t \varepsilon [0 \ldots \text{XMAX}[, y_t \varepsilon [0 \ldots \text{YMAX}[$ and $d_t \varepsilon [0 \ldots \text{DMAX}[$ making it possible to calculate the $x_{img}$ and $y_{img}$ coordinates of the pixel of said at least one compressed image whose intensity is copied into the third-order tensor of said input layer of the compressed images processing path of the neural network at coordinates $(x_t, y_t, d_t)$.

The acquisition device acquires said compressed image containing diffractions of the image of said sample obtained with diffraction filters. Said diffracted image obtained contains the image of the scene of the non-diffracted sample at the center, as well as the projections diffracted along the axes of the various diffraction filters. An input layer of the neural network contains a copy of the eight chromatic representations of the hyperspectral scene of the sample of the diffracted image according to the following non-linear relationship:

$$f(x_t, y_t, d_t) = \begin{cases} x_{img} = x + x_{offsetX}(n) + \lambda \cdot \lambda_{sliceX} \\ y_{img} = y + y_{offsetY}(n) + \lambda \cdot \lambda_{sliceY} \end{cases}$$

with:
$f(x_t, y_t, d_t)$ function calculating the value of the input layer at position $x_t, y_t, d_t$;
$n = \text{floor}(d_t/\text{dMAX})$;
$\lambda = d_t \bmod (\text{dMAX}/7)$;
n between 0 and 7, the number of diffractions of the compressed image;
$d_t$ included between 0 and DMAX;
$x_t$ included between 0 and XMAX;
$y_t$ between 0 and YMAX;
DMAX, the depth constant of the third order tensor of said input layer;
$\lambda_{slicex}$, the spectral pitch constant of the pixel in X of said compressed image;
$\lambda_{sliceY}$, the spectral pitch constant of the pixel in Y of said compressed image;
$x_{offsetx}(n)$ corresponding to the offset along the X axis of diffraction n;
$y_{offsety}(n)$ corresponding to the offset along the Y axis of diffraction n.

The architecture of the deep and convolutional neural network is composed of an encoder for said holographic image and an encoder for said compressed image; each of the encoders making it possible to search for the elementary characteristics specific to the desired detection; followed by a decoder making it possible to merge the specific elementary characteristics of each of the images processed by the encoders and to generate an image of the probabilities of the presence of the characteristics to be detected in the sample. The encoder/decoder structure makes it possible to search for the basic characteristics specific to the main characteristic sought in the image of said sample.

Each encoder is composed of a succession of layers of convolutional neurons alternating with pooling layers (decimation operator of the previous layer) making it possible to reduce the spatial dimension.

The decoder is composed of a succession of layers of deconvolution neurons alternating with unpooling layers (interpolation operation of the previous layer) allowing an increase in the spatial dimension.

For example, such an encoder/decoder structure is described in "SegNet: A Deep Convolutional Encoder-Decoder Architecture for Image Segmentation", Vijay Badrinarayanan, Alex Kendall, Roberto Cipolla.

For example, such a structure of encoders merging different images of the same scene is described in "Multimodal deep learning for robust rgb-d object recognition. In Intelligent Robots and Systems (IROS)", Eitel, A., Springenberg, J. T., Spinello, L., Riedmiller, M., and Burgard, W. (2015) IEEE/RSJ International Conference on, pages 681 #687. IEEE.

A set of fully connected neural layers can be positioned between the encoder and the decoder.

BRIEF DESCRIPTION OF THE FIGURES

The manner of carrying out the invention as well as the advantages which result therefrom will emerge from the following embodiment, given as an indication but not limited to, in support of the appended figures in which

FIG. 1: a schematic front view of the elements of a hyperspectral holographic microscopy device according to one embodiment of the invention;

FIG. 2: a structural schematic representation of the elements of the device of FIG. 1;

FIG. 3: a schematic representation of the optics of the device in FIG. 2;

FIG. 4: a schematic representation of the architecture of the neural network in FIG. 2.

FIG. 5: a schematic representation of the connection of the first layers of the neural network of FIG. 2;

FIG. 6: a schematic representation of the light source of FIG. 2.

FIGS. 7 to 11 are schematic representations similar to FIG. 3 for other embodiments of optics.

WAY OF DESCRIBING THE INVENTION

Figure 1:
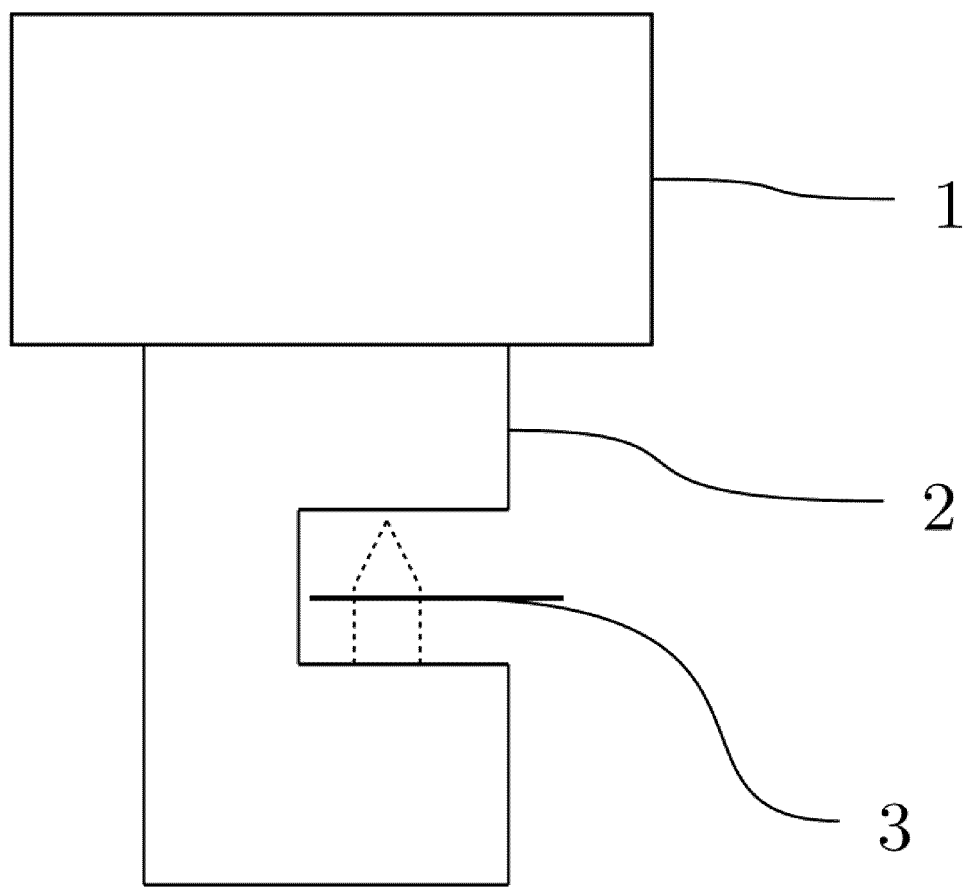
FIGS. 1 to 11 represent.

FIG. 1 illustrates a capture device 2 for capturing the light passing through a sample 3, said capture device 2 comprising measurement optics, a holographic sensor making it possible to obtain a hologram of the sample 3 and a sensor making it possible to obtain a compressed image of light passing through the sample 3. In this embodiment, the term "hyperspectral holographic image" therefore denotes an image comprising the spatial juxtaposition of a compressed image comprising the hyperspectral information and an image of a hologram. The capture device 2 transmits the images obtained to a processing device 1 merging the information contained in the hologram of the sample 3 and the compressed image of light passing through the sample 3 in order to detect particularities in the sample 3.

Figure 2:
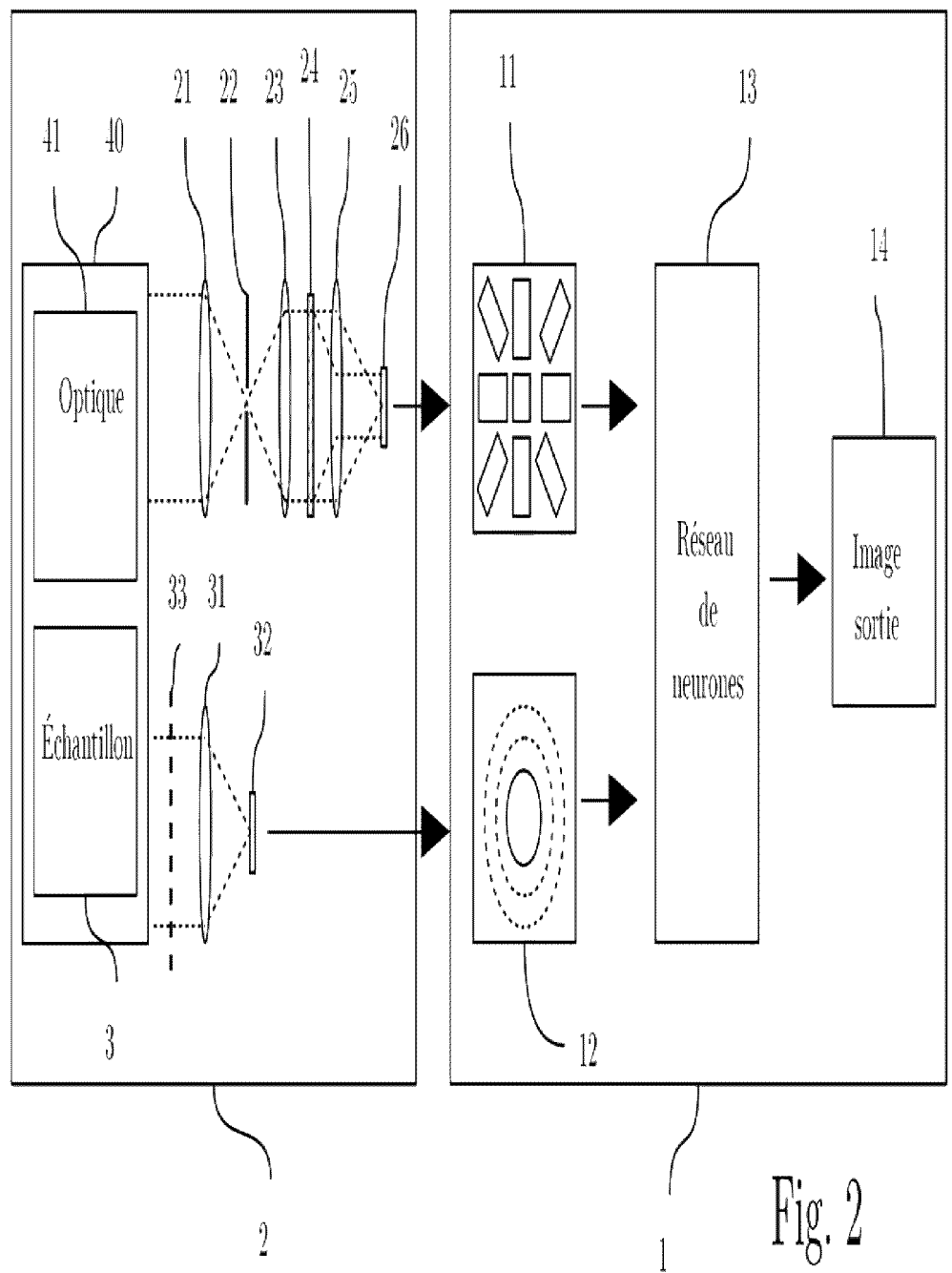

As shown in FIG. 2, the capture device 2 comprises a device for acquiring a compressed image of the light passing through the sample 3, which comprises a first converging lens 21 which focuses the image of the sample 3 on an opening 22. A collimator 23 captures the rays passing through the opening 22 and transmits these rays to a diffraction grating 24. A second converging lens 25 focuses these rays coming from the diffraction grating 24 onto a capture surface 26.

The structure of this optical assembly is relatively similar to that described in the scientific publication "Computed-tomography imaging spectrometer: experimental calibration and reconstruction results", published in APPLIED OPTICS, volume 34 (1995) number 22.

Figure 5:
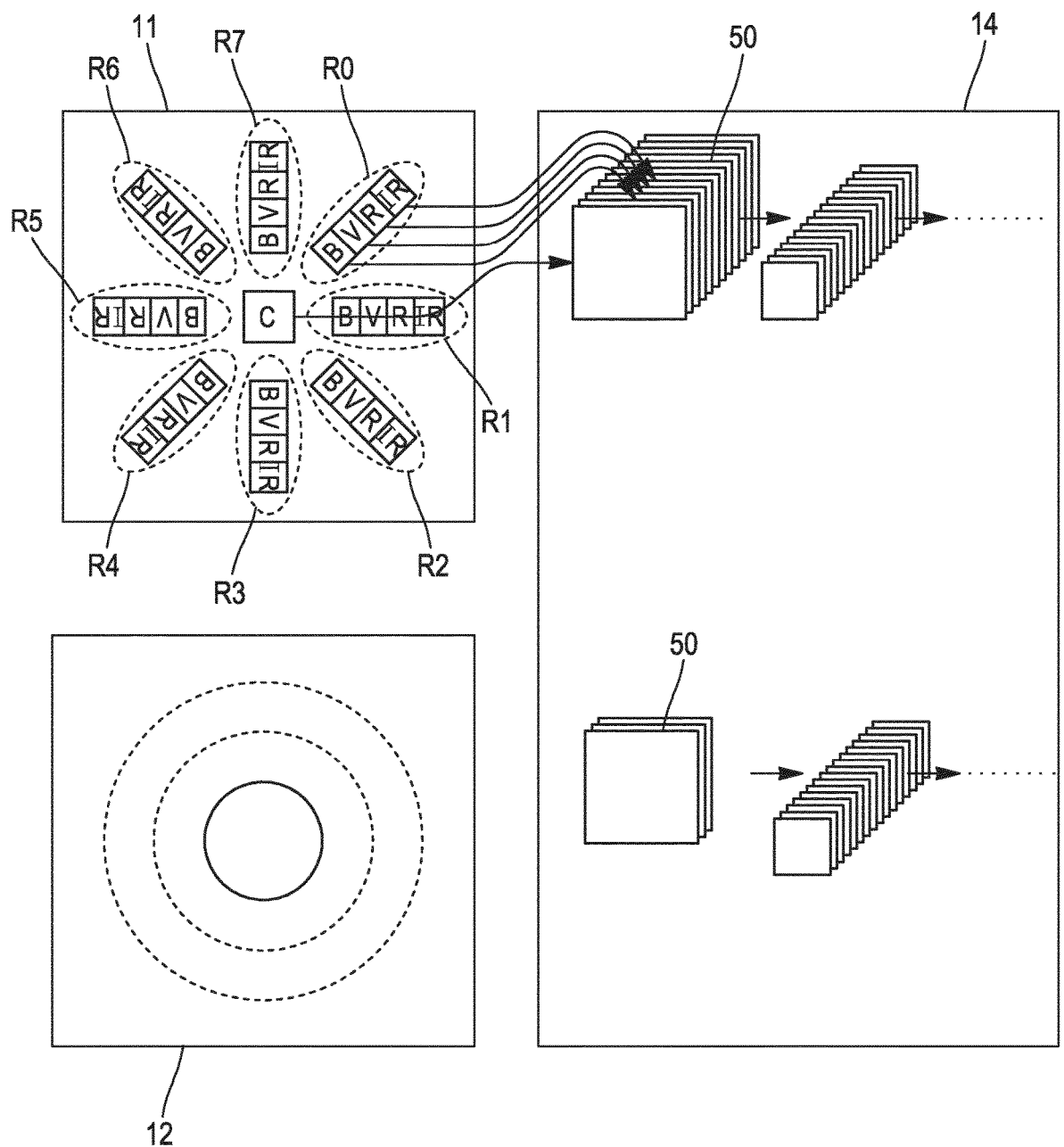

This optical structure makes it possible to obtain a compressed image 11, illustrated in FIG. 5, showing several diffractions R0-R7 of the image of the sample 3 arranged around an undiffracted image of small size C. In the example of FIG. 5, the compressed image shows eight distinct diffractions R0-R7 obtained with two diffraction axes of the diffraction grating 24.

As a variant, three diffraction axes can be used on the diffraction grating 24 so as to obtain a diffracted image 11 with sixteen diffractions.

As illustrated in FIG. 2, the capture device 2 comprises a device for acquiring a holographic image of the sample 3, which comprises a converging lens 31 which focuses the hologram of the sample 3 on a capture surface 32.

This structure makes it possible to obtain a holographic image 12, illustrated in FIG. 5, containing the hologram of the sample 3.

The processing device 1 comprises a neural network 13 merging the information contained in the images 11 and 12 and generates an image 14 of which each pixel at coordinates x and y indicates the probability of presence of the particularity sought in the sample 3 at the same x and y coordinates of the sample 3 plane.

Alternatively, the processing device 1 comprises a neural network 13 configured to merge the information contained in the images 11 and 12 and generates an image 14 representing the sample as it would be seen by a standard microscope.

Thus, according to an independent aspect, an invention relates to a device for measuring a sample, said device comprising:
- a capture device 2 for acquiring a compressed image 11 of the sample 3 containing spectral and amplitude information of the light signal illuminating said sample 3 and holographic interference FIG. 12 of a reference light beam R and of a light beam O having illuminated said sample 3 containing the amplitude and phase information of the light signal illuminating said sample; and
- an illumination device 34 of said sample 3; and
- a device for reconstructing a microscopy image of the sample integrating a deep and convolutional neural network 13 architectured to calculate a light intensity in said sample 3 from the compressed image 11 and the holographic interference FIG. 12 of the beam of reference R with the beam O illuminating the sample 3, and generating an image whose value of each pixel at the coordinates u and v corresponds to the light intensity at the x and y coordinates of the plane of said sample 3; said deep and convolutional neural network 13 being architectured so as to merge the information of the sensors of the diffracted image 11 and of the image of the holographic interference FIG. 12.

The neural network is configured to reconstruct the microscopic image from the detections made.

The image (u; v) is magnified relative to the area (x; y) of the sample plane imaged.

As this aspect in itself appears to be innovative, the applicant reserves the right to protect it in itself, independently, by any appropriate means from the present patent application.

Figure 3:
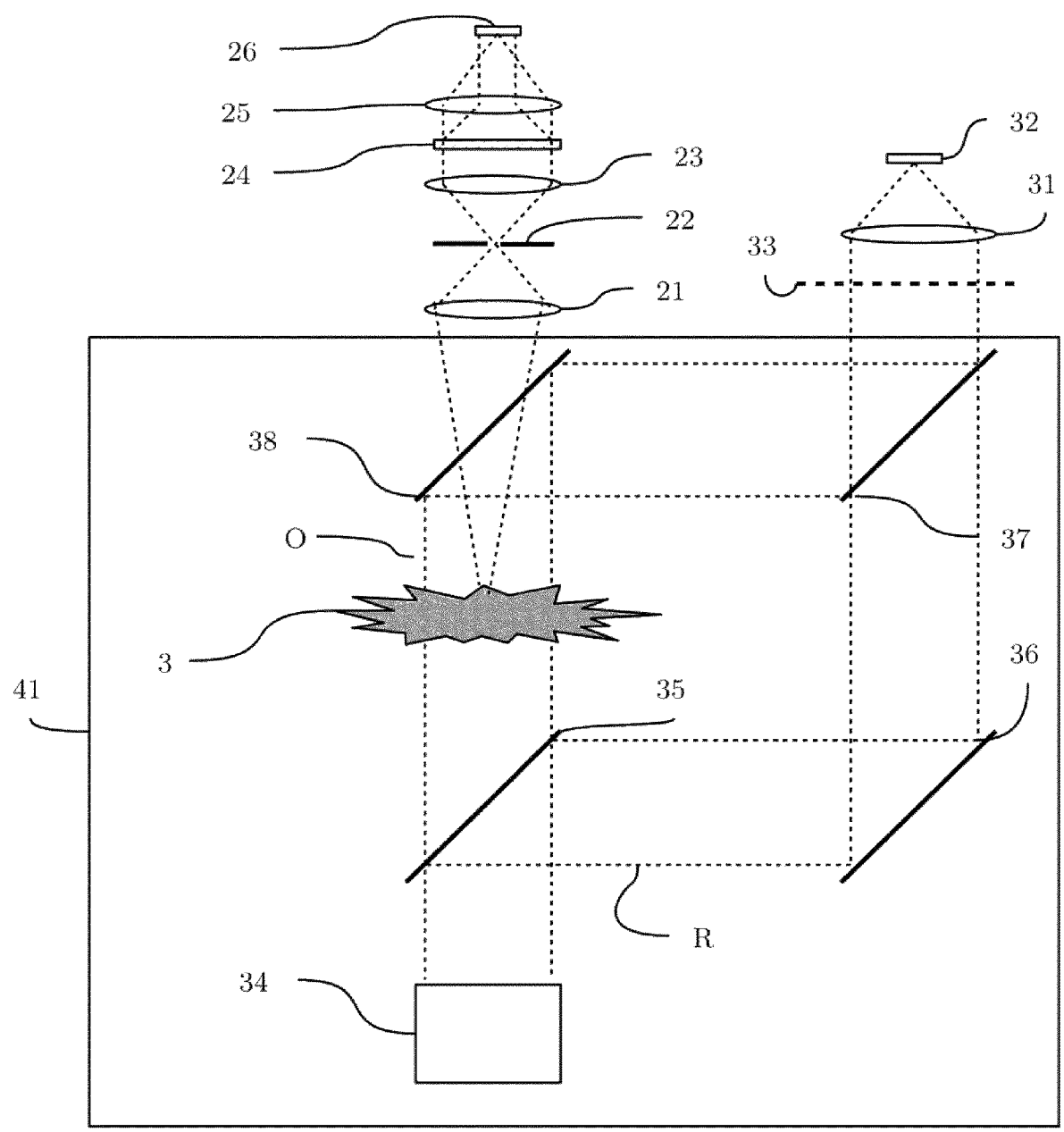
Figure 6:
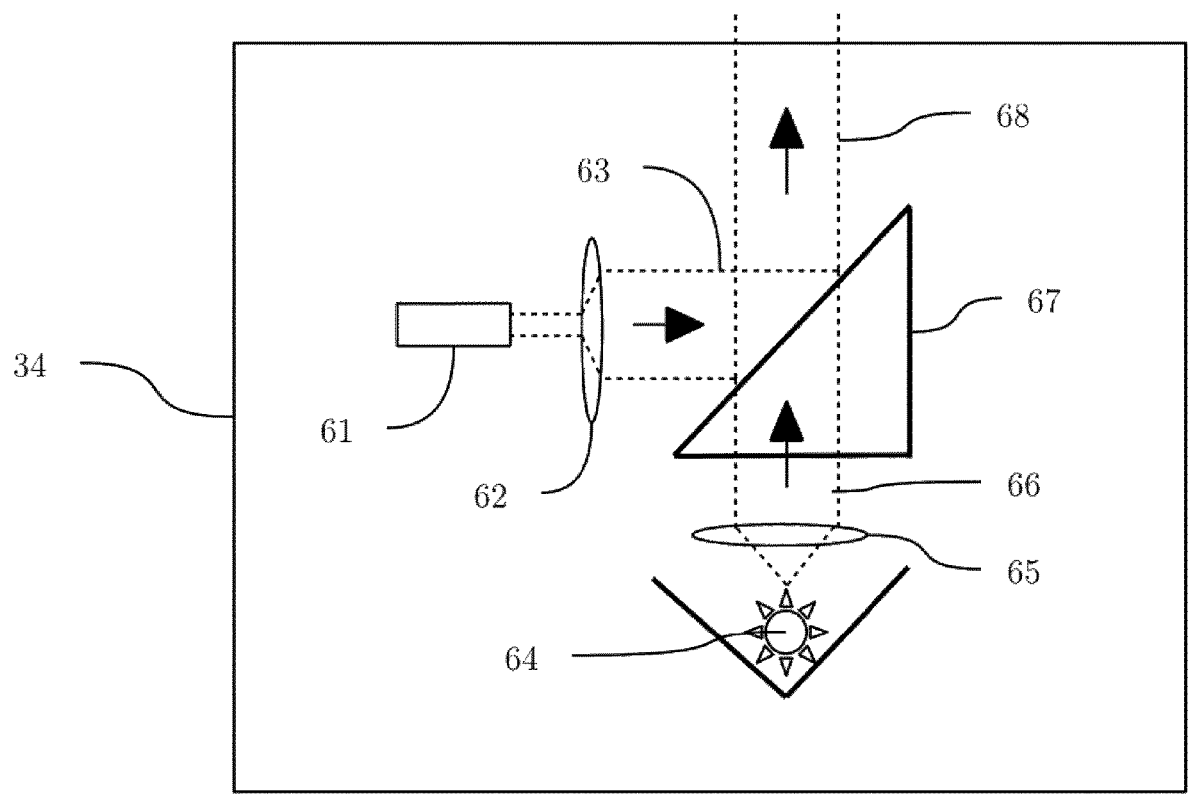

The optical device 41 comprises, as illustrated in FIG. 3, the following elements:
- a light source, as illustrated in FIG. 6, configured so as to generate a light beam comprising a white, multichromatic and non-coherent light 64 and a mono-chromatic and coherent light beam 61 transmitted through said sample 3; and
- an optical path configured so as to generate a reference light beam R comprising the semi-reflecting mirror 35 and the reflecting mirror 36; and
- an area allowing the beam from the first semi-reflecting mirror 35 to pass through said sample 3 so as to generate an object beam O containing the light that has passed through sample 3; and
- a semi-reflecting mirror 38 configured so as to transmit said object light beam O in the direction of the capture device for acquiring the diffracted image, the first element of which is the converging lens 21 and toward the semi-reflecting mirror 37 configured in such a way as to have said object light beam O and reference light beam R interfere; the interference figures generated on the semi-reflecting mirror 37 are the hologram of said sample 3;
- a semi-reflecting mirror 37 generating the hologram of said sample 3 and transmitting said hologram towards the holographic acquisition device, the first element of which is the chromatic filter 33, retaining the wavelengths of the monochromatic light beam.

The light beam comprising white, multi-chromatic and non-coherent light is emitted by a white, multi-chromatic and non-coherent light source 64 and the mono-chromatic and coherent light beam is emitted by a mono chromatic and coherent light beam source 61.

The optical housing 40 is obtained by placing the sample 3 in the dedicated area of the optical device 41.

The capture surfaces 26, and 32 may correspond to a CCD sensor (for "charge-coupled device"), to a CMOS sensor (for "Complementary metal-oxide-semiconductor", a technology for manufacturing electronic components), or to any other known sensor. For example, the scientific publication "Practical Spectral Photography", published in Eurographics, volume 31 (2012) number 2, proposes to associate the diffraction optical structure with a standard digital camera to capture the compressed image.

Preferably, each pixel of the compressed 11 and holographic 12 images is coded on three colors red, green and blue and on 8 bits thus making it possible to represent 256 levels on each color.

As a variant, the sensing surfaces 26, or 32 can be a device the sensed wavelengths of which are not in the visible field. For example, the device 2 can integrate sensors whose wavelength is between 300 nanometers and 2000 nanometers.

When the compressed 11, and holographic 12 images of the observed sample 3 are obtained, the detection means implements a neural network 13 to detect a feature in the observed scene from the information of the compressed 11, and holographic 12 images.

This neural network 13 aims at determining the probability of presence of the desired particularity for each pixel located at the x and y coordinates of the observed hyperspectral scene 3.

Figure 4:
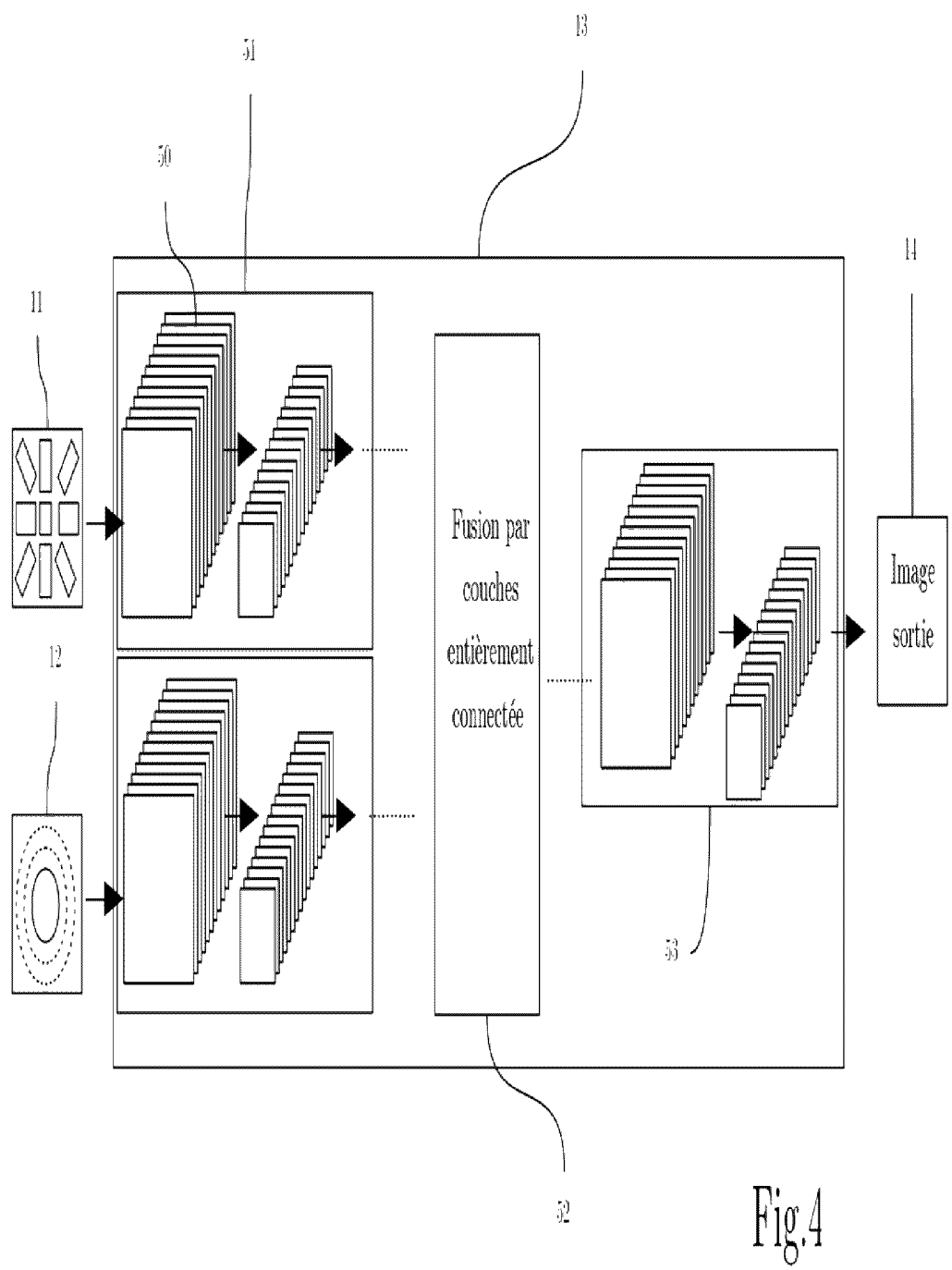

To do this, as illustrated in FIG. 4, the neural network 13 includes an encoder 51 for the compressed image and an encoder 51 for the holographic image; each encoder has an input layer 50, able to extract the information from the image 11, or 12. The neural network merges the information from the two encoders 51 by means of convolutional layers or fully connected layers. A decoder 53 and its output layer, able to process this information so as to generate an image 14 whose intensity of each pixel at the x and y coordinate corresponds to the probability of presence of the particularity at the x and y coordinates of the sample 3 is inserted following the merging of the information.

As illustrated in FIG. 5, said input layers 50 of the encoders 51 of the neural network 13 are filled with information from said compressed image 11 and said holographic image 12.

The input layer 50 of the encoder 51 processing the information of said holographic image 12 is filled with a copy of said holographic image 12, each pixel of which is scaled by means of a multiplication by a constant allowing each pixel to be in the range [0 . . . 1].

The input layer 50 of the encoder 51 processing the information of said compressed image 11 is filled according to the following non-linear relationship:

$$f(x_t, y_t, d_t) = \begin{cases} x_{img} = x + x_{offsetX}(n) + \lambda \cdot \lambda_{sliceX} \\ y_{img} = y + y_{offsetY}(n) + \lambda \cdot \lambda_{sliceY} \end{cases}$$

with $f(x_t, y_t, d_t)$ function calculating the value of the input layer at position $x_t, y_t, d_t$;

$n = \text{floor}(d_t/\text{dMAX})$;

$\lambda = d_t \bmod(\text{dMAX}/7)$;

n between 0 and 7, the number of diffractions of the compressed image;

$d_t$ included between 0 and DMAX;

$x_t$ included between 0 and XMAX;

$y_t$ between 0 and YMAX;

DMAX, the depth constant of the third order tensor of said input layer;

$\lambda_{slicex}$, the spectral pitch constant of the pixel in X of said compressed image;

$\lambda_{sliceY}$, the spectral pitch constant of the pixel in Y of said compressed image;

$x_{offsetx}(n)$ corresponding to the offset along the X axis of the diffraction n;

$y_{offsetx}(n)$ corresponding to the offset along the Y axis of diffraction n.

Floor is a well-known truncation operator.

Mod stands for the "modulo" operator.

The architecture of said neural network 13 is composed of a set of convolutional layers such as layer 50 assembled linearly and alternately with decimation (pooling) or interpolation (unpooling) layers.

A convolutional layer of depth d, denoted CONV (d), is defined by d convolution kernels, each of these convolution kernels being applied to the volume of the input tensor of order three and of size $X_{input}, Y_{input}, d_{input}$. The convolutional layer thus generates an output volume, tensor of order three, having a depth d. An activation function ACT is applied to the calculated values of the output volume.

The parameters of each convolutional kernel of a convolutional layer are specified by the neural network training procedure.

Different ACT activation functions can be used.

For example, this function can be a ReLu function, defined by the following equation:

ReLu(x)=max(0,x)

A decimation layer makes it possible to reduce the width and height of the third order input tensor for each depth of said third order tensor. For example, a MaxPool (2,2) decimation layer selects the maximum value of a sliding tile on the surface of 2×2 values. This operation is applied to all the depths of the input tensor and generates an output tensor having the same depth and a width divided by two, as well as a height divided by two.

A neural network architecture allowing the direct detection of features in the hyperspectral scene can be as follows:

| Input 1 | Input 2 |
|---|---|
| ⇒CONV(64) | ⇒CONV(64) |
| ⇒MaxPool(2,2) | ⇒MaxPool(2,2) |
| ⇒CONV(64) | ⇒CONV(64) |
| ⇒MaxPool(2,2) | ⇒MaxPool(2,2) |

⇒CONV(64)
⇒CONV(64)
⇒MaxUnpool(2,2)
⇒CONV(64)
⇒MaxUnpool(2,2)
⇒CONV(64)
⇒MaxUnpool(2,2)
⇒CONV(1)
⇒Output Alternatively, the number of CONV(d) convolution and MaxPool (2.2) decimation layers can be changed in order to facilitate the detection of particularities having higher semantic complexity. For example, a higher number of convolutional layers makes it possible to process more complex signatures of shape, texture, or spectral characteristics of the particularity sought in the hyperspectral scene.

Alternatively, the number of CONV(d) deconvolution and MaxUnpool (2, 2) interpolation layers can be changed to facilitate reconstruction of the output layer. For example, a higher number of deconvolution layers makes it possible to reconstruct an output with greater precision.

Alternatively, the convolution layers CONV(64), may have a different depth than 64 in order to handle a different number of local particularities. For example, a depth of 128 makes it possible to locally process 128 different particularities in a complex hyperspectral scene.

Alternatively, the interpolation layers MaxUnpool(2, 2) can be of different interpolation dimension. For example, a layer MaxUnpool(4, 4) can increase the processing dimension of the top layer.

As a variant, the activation layers ACT of ReLu (x) type inserted following each convolution and deconvolution can be of a different type. For example, the softplus function defined by the equation: $f(x)=\log(1+e^x)$ can be used.

Alternatively, the decimation layers MaxPool(2, 2) can be of different decimation size. For example, a layer MaxPool (4, 4) makes it possible to reduce the spatial dimension more quickly and to concentrate the semantic research of the neural network on the local particularities.

Alternatively, fully connected layers can be inserted between the two central convolution layers at line 6 of the description in order to process detection in a higher mathematical space. For example, three fully connected layers of size 128 can be inserted.

Alternatively, the dimensions of the convolution layers CONV(64), decimation layers MaxPool(2, 2), and interpolation layers MaxUnpool(2, 2) can be adjusted on one or more layers, in order to adapt the architecture of the neural network closest to the type of particularities sought in the hyperspectral scene.

The weights of said neural network 13 are calculated by means of training. For example, learning by backpropagation of the gradient or its derivatives from training data can be used to calculate these weights.

Alternatively, the neural network 13 can determine the probability of the presence of several distinct particularities within the same observed scene. In this case, the last convolutional layer will have a depth corresponding to the number of distinct features to be detected. Thus the convolutional layer CONV(1) is replaced by a convolutional layer CONV(u), where u corresponds to the number of distinct particularities to be detected.

As a variant, normalization layers, for example of the BatchNorm or GroupNorm type, as described in "Batch Normalization: Accelerating Deep Network Training by Reducing Internal Covariate Shift", Sergey Ioffe, Christian Szegedy, February 2015 and "Group Normalization", Yuxin Wu, Kaiming He, FAIR, June 2018, can be inserted before or after each activation layer or at different levels of the neural network structure.

The weights of said neural network 13 are calculated by means of training. For example, learning by backpropagation of the gradient or its derivatives from training data can be used to calculate these weights.

Alternatively, the neural network 13 can determine the probability of the presence of several distinct particularities within the same observed scene. In this case, the last convolutional layer will have a depth corresponding to the number of distinct features to be detected. Thus the convolutional layer CONV (1) is replaced by a convolutional layer CONV (u), where u corresponds to the number of distinct features to be detected.

As illustrated in FIG. 6, the illumination means 34 of sample 3 is obtained by a device comprising:
- a first source of white, multi-chromatic and non-coherent light 64; and
- a first converging lens 65 configured to collimate light rays from said source of white, multi-chromatic and non-coherent light 64; and
- a second source of mono-chromatic and coherent light 61; and
- an optical system 62 for expanding the beam configured to extend and collimate the light rays coming from said source of monochromatic and coherent light 61 (this optical system for expansion comprises, for example, along the optical path, a second divergent lens then a third converging lens collimating the beam from the second diverging lens); and
- a prism 67 configured to add the light rays 63 coming from said mono-chromatic and coherent light source 61 and the light rays 66 coming from said white, multi-chromatic and non-coherent light source 64 in a light ray 68 directed towards the sample 3.

Figure 7:
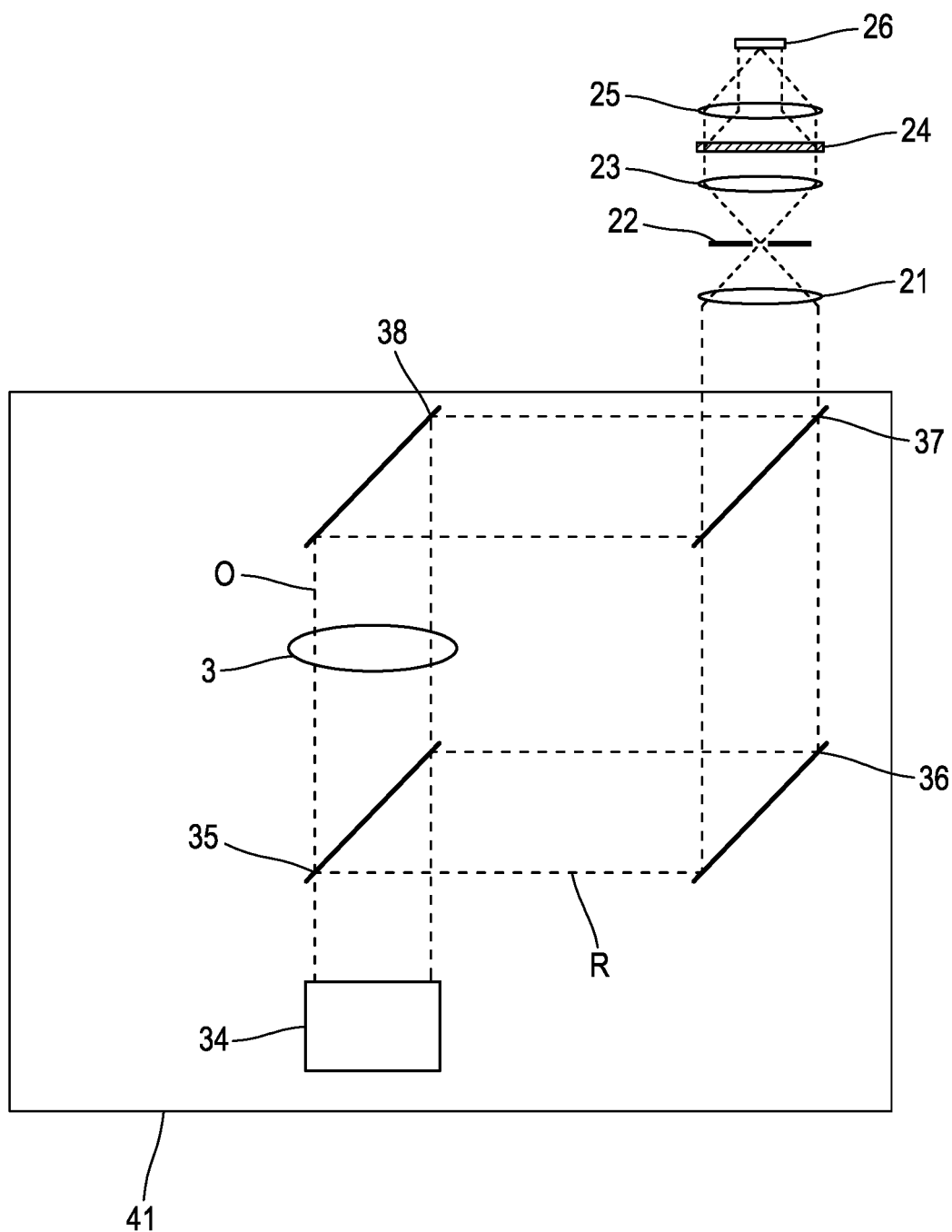

FIG. 7 shows schematically the optical assembly of another embodiment of the invention. One of the peculiarities of the embodiment of FIG. 7 is that the fusion between the diffraction and the hologram takes place optically rather than through the neural network. The optical assembly shown in FIG. 7 therefore makes it possible to obtain a compressed image of the hologram. Therefore, in this embodiment, by the term "hyperspectral holographic image" is meant a compressed image (including diffraction) of a holographic image of the sample.

More specifically, the optical device shown in FIG. 7 comprises the following elements:
- a light source 34;
- an optical path configured so as to generate a reference light beam R comprising a semi-reflecting mirror 35, and the reflecting mirror 36; and
- a zone allowing the beam from the first semi-reflecting mirror 35 to pass through said sample 3 so as to generate an object beam O containing the light having passed through the sample 3, and the reflecting mirror 38; and
- a semi-reflecting mirror 37 generating the hologram of said sample 3 by adding the reference beam from the reflecting mirror 36 and the object beam from the reflecting mirror 38, and transmitting said hologram towards the acquisition device; and
- the acquisition device which comprises a first converging lens 21 which focuses the holographic image of sample 3 on an opening 22, a collimator 23 captures the rays passing through the opening 22 and transmits these rays to a diffraction grating 24, a second converging lens 25 which focuses these rays coming from the diffraction grating 24 on the capture surface 26.

Thus, more precisely, the optical mixing produced on the mirror 37 comprises both the interference between the coherent mono-chromatic component of the object beam and of the reference beam, but also at least the entire beam transmitted through the sample. It is this entire signal that is submitted to diffraction. The neural network is configured to retrieve from the acquired image the parts of the signal allowing it to measure the desired characteristic. An intermediate step implemented by the neural network may be to split a part of the signal corresponding to the hologram from the signal parts corresponding to the diffraction. However, the configuration of the neural network will not necessarily implement such a separation.

The neural network input layer of this embodiment may be populated like the neural network input layer of the first embodiment populated with the compressed image.

A neural network architecture allowing the direct detection of features in the hyperspectral scene can be as follows:

Input
⇒CONV(64)
⇒MaxPool(2,2)
⇒CONV(64)
⇒MaxPool(2,2)
⇒CONV(64)
⇒CONV(64)
⇒MaxUnpool(2,2)
⇒CONV(64)
⇒MaxUnpool(2,2)
⇒CONV(64)
⇒MaxUnpool(2,2)
⇒CONV(1)
⇒Output The variants of neural networks discussed above are also applicable to this embodiment.

Figure 8:
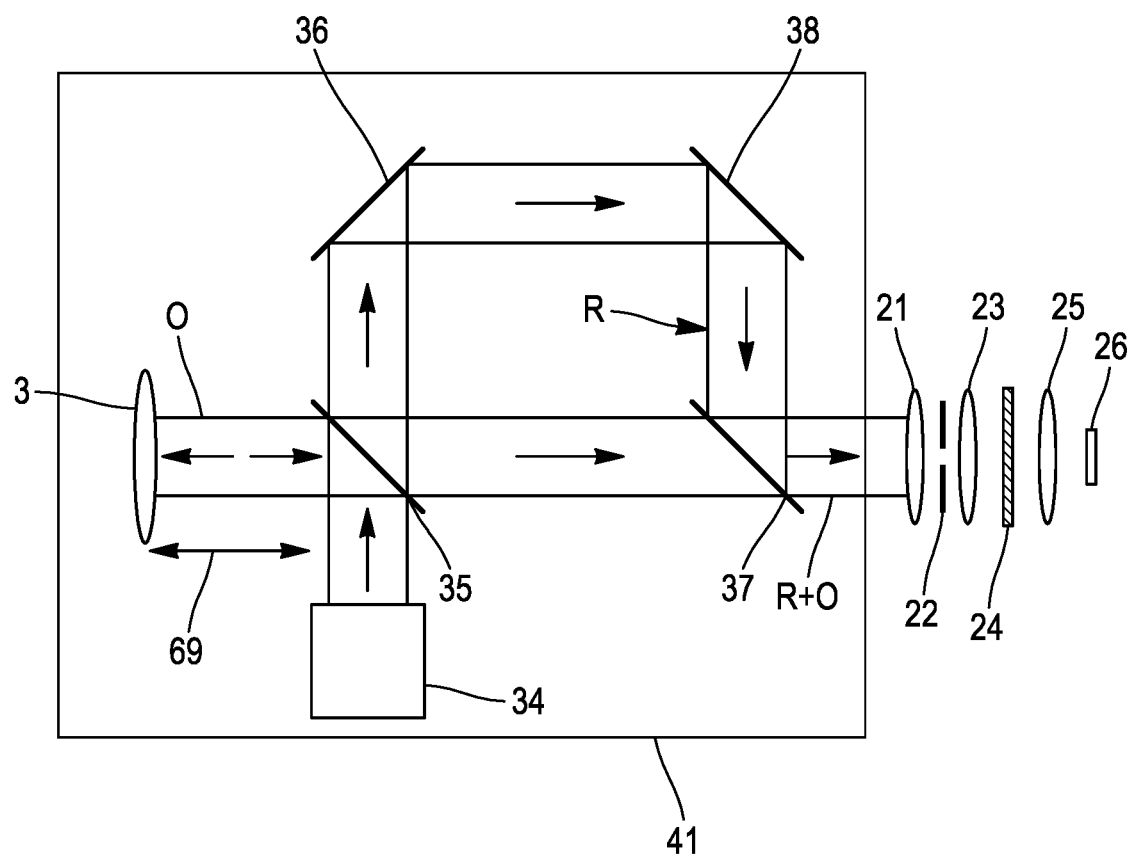

FIG. 8 shows schematically the optical assembly of another embodiment of the invention. Just like in the embodiment of FIG. 7, in the embodiment of FIG. 8, the fusion of the diffraction and the hologram is done optically rather than by the neural network. The optical assembly shown in FIG. 8 therefore makes it possible to obtain a compressed image of the hologram. One of the peculiarities of the embodiment of FIG. 8 is that the hologram is made in reflection rather than in transmission.

More specifically, the optical device shown in FIG. 8 comprises the following elements:
- a light source 34;
- an optical path configured so as to generate a reference light beam R comprising a semi-reflecting mirror 35, and the reflecting mirrors 36 and 38; and
- an area allowing a beam from the first semi-reflecting mirror 35 to be reflected by said sample 3 so as to generate an object beam O containing the light reflected by sample 3, and the semi-reflecting mirror 37; and
- a semi-reflecting mirror 37 generating the hologram of said sample 3 by adding the reference beam from the reflecting mirror 38 and the object beam, and transmitting said hologram towards the acquisition device; and the acquisition device which comprises a first converging lens 21 which focuses the holographic image of the sample 3 on an opening 22, a collimator 23 captures the rays passing through the opening 22 and transmits these rays to a diffraction grating 24, a second converging lens 25 which focuses these rays coming from the diffraction grating 24 on the capture surface 26.

The associated neural network can have the same architecture as presented above, the fact that the acquisition is done by reflection rather than by transmission being reflected in the parameters of the neural network.

Figure 9:
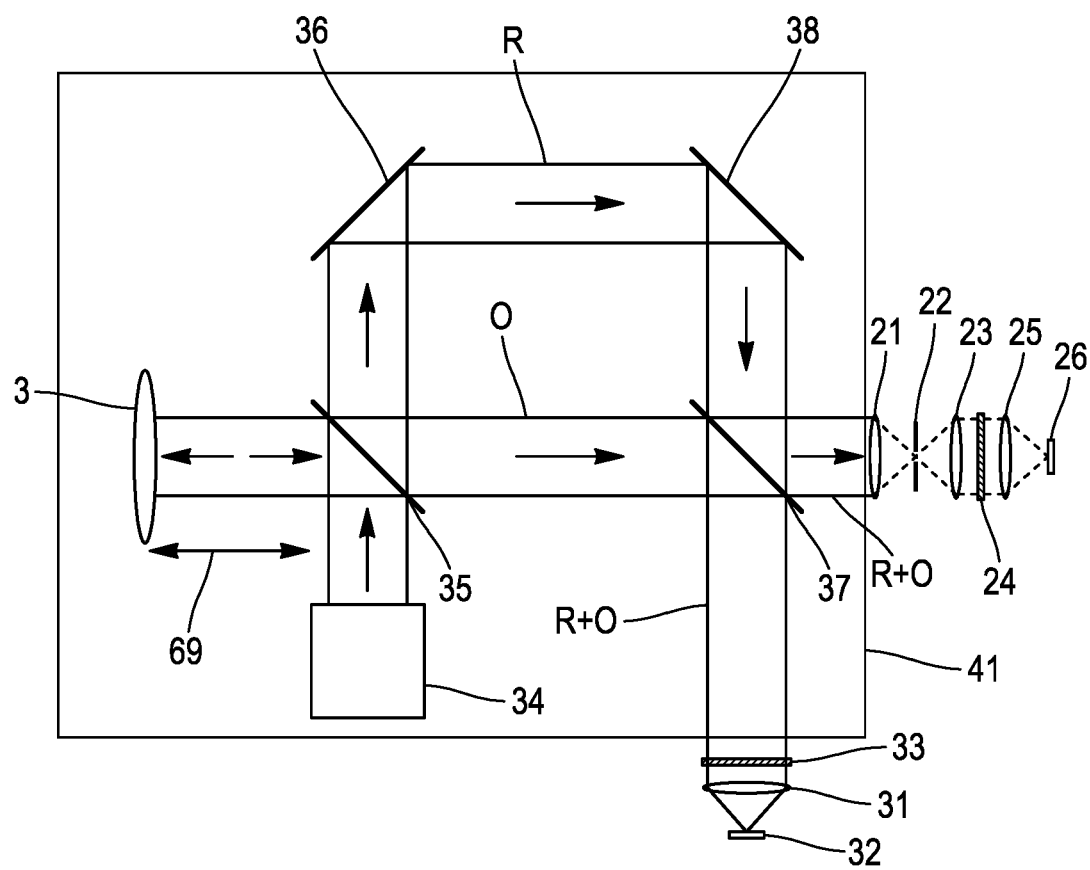

FIG. 9 shows schematically the optical assembly of another embodiment of the invention. Just like in the embodiment of FIG. 3, in the embodiment of FIG. 9, the fusion of the diffraction and the hologram is done by the neural network. One of the peculiarities of the embodiment of FIG. 9 is that the hologram is made in reflection rather than in transmission.

More specifically, the optical device shown in FIG. 9 comprises the following elements:

- a light source 34;
- an optical path configured so as to generate a reference light beam R comprising a semi-reflecting mirror 35, and the reflecting mirrors 36 and 38; and
- an area allowing a beam from the first semi-reflecting mirror 35 to be reflected by said sample 3 so as to generate an object beam O containing the light reflected by sample 3, and the semi-reflecting mirror 37; and
- a semi-reflecting mirror 37 generating the hologram of said sample 3 by adding the reference beam from the reflecting mirror 38 by transmission and the object beam by reflection, and transmitting said hologram in the direction of the holographic image acquisition device whose first element is the chromatic filter 33; and also transmitting the object beam O to the device for acquiring the compressed image which comprises a first converging lens 21 which focuses the image reflected by the sample 3 on an opening 22, a collimator 23 which captures the rays passing through the opening 22 and transmits these rays to a diffraction grating 24, a second converging lens 25 which focuses these rays coming from the diffraction grating 24 on the capture surface 26.

In these reflective embodiments, control of the optical path between the sample 3 and the light source 34 is necessary. It is carried out by means of an adjustment device 69, for example of the micrometric screw type, arranged between the sample holder and the mirror 35.

Figure 10:
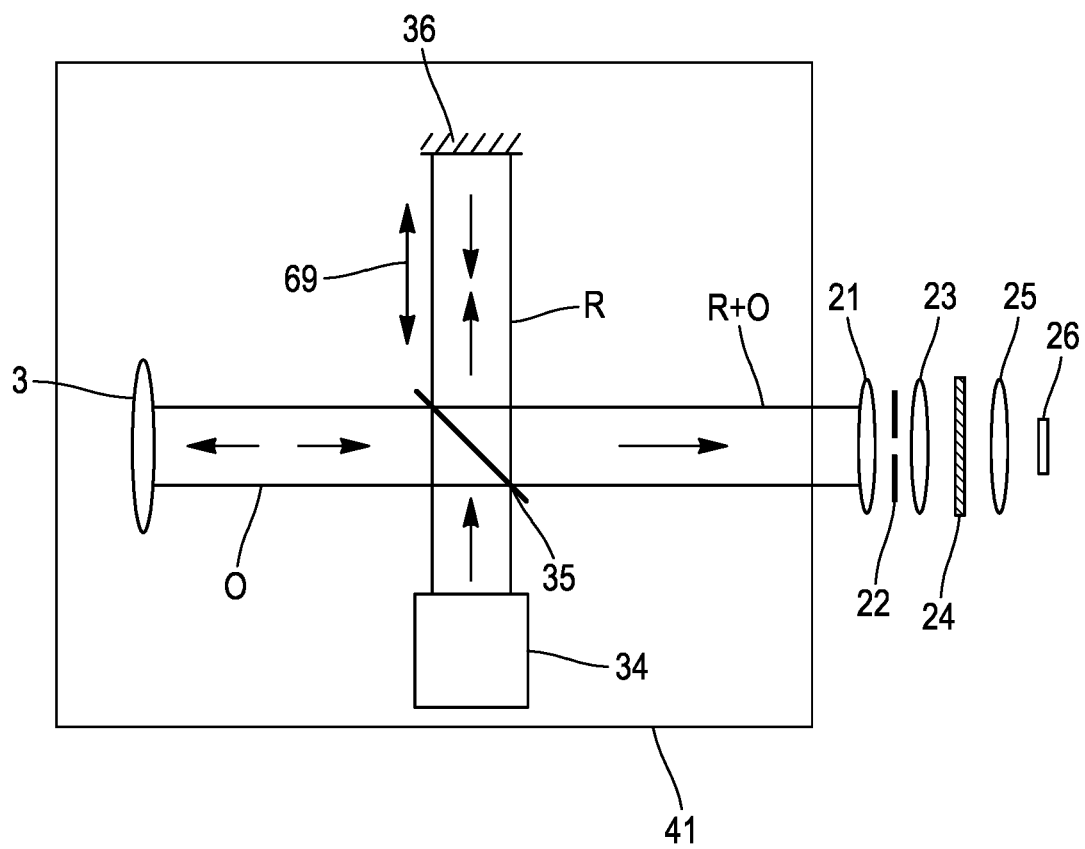

FIG. 10 schematically shows the optical assembly of another embodiment of the invention. As in the embodiment of FIG. 8, in the embodiment of FIG. 10, the fusion of the diffraction and the hologram is done optically. One of the peculiarities of the embodiment of FIG. 10 is that the hologram is made in reflection rather than in transmission. In addition, the number of mirrors is reduced, which simplifies the production.

More specifically, the optical device shown in FIG. 10 comprises the following elements:

- a light source 34;
- an optical path configured so as to generate a reference light beam R comprising a semi-reflecting mirror 35, and a reflecting mirror 36; and
- a zone allowing a beam coming from the first semi-reflecting mirror 35 to be reflected by said sample 3 so as to generate an object beam O containing the light reflected by the sample 3, and again the semi-reflecting mirror 35 generating the hologram of said sample 3 by adding the reference beam from the reflecting mirror 36 and the object beam by reflection on the sample, and transmitting said hologram in the direction of the acquisition device;
- the acquisition device which comprises a first converging lens 21 which focuses the holographic image of sample 3 on an opening 22, a collimator 23 captures the rays passing through the opening 22 and transmits these rays to a diffraction grating 24, a second converging lens 25 which focuses these rays coming from the diffraction grating 24 on the capture surface 26.

In this embodiment, the adjustment device 69 is for example arranged between the mirror 35 and the mirror 36 in order to adjust the position of the mirror 36.

Figure 11:
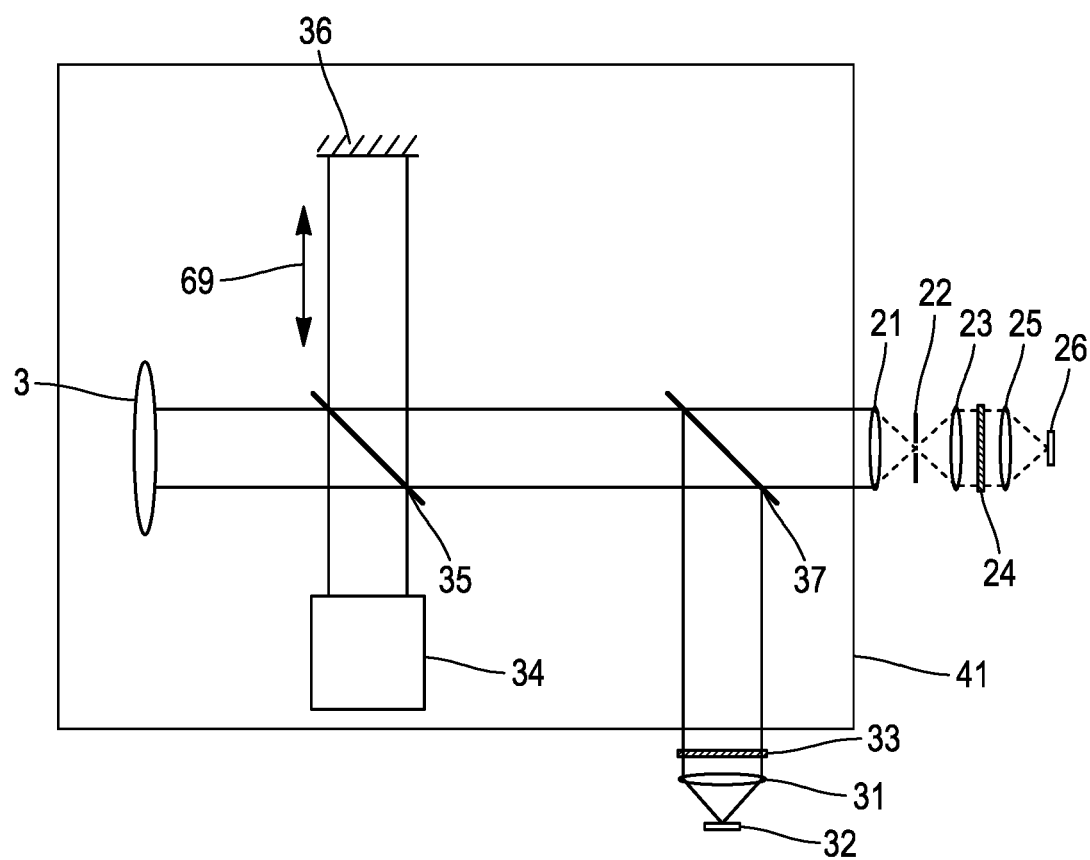

FIG. 11 schematically shows the optical assembly of another embodiment of the invention. Just like in the embodiment of FIG. 3, in the embodiment of FIG. 11, the merging between the compression and the hologram is done by the neural network. One of the peculiarities of the embodiment of FIG. 11 is that the hologram is made in reflection rather than in transmission. In addition, the number of mirrors is reduced, which simplifies the production.

More specifically, the optical device shown in FIG. 11 comprises the following elements:

- a light source 34;
- an optical path configured so as to generate a reference light beam R comprising a semi-reflecting mirror 35, and a reflecting mirror 36; and
- an area allowing a beam from the first semi-reflective mirror 35 to be reflected by said sample 3 so as to generate an object beam O containing the light reflected by sample 3; and
- the semi-reflecting mirror 35 on the one hand generating the hologram of said sample 3 by adding the reference beam from the reflecting mirror 36 and the object beam, and transmitting said hologram towards the semi-reflecting mirror 37,
- the semi-reflecting mirror 37 separating this signal on the one hand towards the holographic image acquisition device, the first element of which is the chromatic filter 33; and on the other hand to the device for acquiring the compressed image which comprises a first converging lens 21 which focuses the image reflected by the sample 3 on an opening 22, a collimator 23 which captures the rays passing through the opening 22 and transmits these rays to a diffraction grating 24, a second converging lens 25 which focuses these rays coming from the diffraction grating 24 on the capture surface 26.

Some of the methods described herein may be partially implemented by a processor of a computer running a computer program including instructions for performing these methods. The computer program can be recorded on a computer readable medium.

REFERENCES

Capture device 2
Sample 3
Holographic image 12
Compressed image 11
Neural network 13
Image 14
Converging lens 21
Opening 22
Collimator 23
Diffraction grating 24

Second converging lens 25
Capture surfaces 26, 32
Converging lens 31
Illumination device 34
Semi-reflecting mirror 35, 37, 38
Reflective mirror 36
Optical device 41
Layer 50
Encoder 51
Decoder 53
Mono-chromatic and coherent light source 61
Optical system 62
Light rays 63
Multichromatic and non-coherent white light source 64
First converging lens 65
Light rays 66
Prism 67
Light ray 68
Adjustment device 69

The invention claimed is:

1. Device for holographic and hyperspectral measuring and analyzing of a sample, wherein said device comprises:
    an acquisition device of an image containing spectral and amplitude information of the light signal illuminating said sample; and holographic interference figures of a reference light beam and of a light beam having illuminated said sample containing the amplitude and phase information of the light signal illuminating said sample; and
    an illumination device of said sample; and
    a device for reconstructing the hyperspectral holographic image and analyzing the amplitude, phase and spectrum properties of the light illuminating said sample integrating a deep and convolutional neural network architectured for calculating a probability of presence of the particularity sought in said sample from the hyperspectral holographic image, and generating an image for each sought particularity whose value of each pixel at the x and y coordinates corresponds to the probability presence of said particularity at the same x and y coordinates of said sample.

2. Device according to claim 1, in which the acquisition device comprises a device for acquiring a compressed image of the sample containing said spectral and amplitude information of the illuminating light signal, and a device for acquiring an image of said holographic interference figures, in which the neural network is architectured to calculate the probability of the presence of the particularity sought in said sample from the compressed image and the figure of holographic interference of the reference beam with the illuminating beam, said deep convolutional neural network being architectured so as to merge the information from the sensors of the diffracted image and of the image of the holographic interference figure.

3. Device according to claim 2, in which the illumination device of said sample comprises a light source collimated and configured so as to generate a light beam, in which the acquisition device for acquiring said diffracted image and said image of the holographic interference figures comprises:
    a first semi-reflecting mirror separating the light beam from said light source into two light beams: a first object beam, passing through the sample and a second reference beam towards a second reflecting mirror; and
    the second reflecting mirror directing said reference light beam towards a third semi-reflecting mirror; and
    the third semi-reflecting mirror, adding said reference beam with said object beam and transmitted towards a chromatic filter; and
    an area in which said sample can be positioned so as to be traversed by said object light beam; and
    a fourth semi-reflective mirror, separating said object beam coming from the area in which said sample can be positioned into two beams: a third beam being transmitted in the direction of the third semi-reflecting mirror and a fourth beam being transmitted towards a first converging lens; and
    the first converging lens configured to image said sample over an opening; and
    a collimator configured to pick up the beam passing through said opening and to transmit this beam on a diffraction grating; and
    a second converging lens configured to focus the rays coming from the diffraction grating on a capture surface,
    the chromatic filter configured to filter the wavelengths of said object and reference beams, added and interfered into a hologram on the third semi-reflecting mirror; and
    a third converging lens configured to focus the hologram rays coming from the chromatic filter on a capture surface.

4. The device of claim 1, wherein the acquisition device comprises a single device for acquiring a compressed image of the holographic interference figures of the sample.

5. Device according to claim 4, in which the illumination device for illuminating said sample comprises a light source collimated and configured so as to generate a light beam, in which the acquisition device comprises:
    a first semi-reflecting mirror separating the light beam from said light source into two light beams: a first object beam, illuminating the sample and a second reference beam; and
    an area in which said sample can be positioned so as to be imaged by said object light beam; and
    a system of mirrors adapted to have the object and reference beams interfere,
    a first converging lens configured to image said hologram of the sample on an opening; and
    a collimator configured to pick up the beam passing through said opening and to transmit this beam on a diffraction grating; and
    a second converging lens configured to focus the rays coming from the diffraction grating on a capture surface.

6. Device according to claim 1, wherein said illumination device is obtained by a light source comprising:
    a first source of white, multi-chromatic and non-coherent light; and
    a first converging lens configured to collimate light rays from said first source of white, multi-chromatic and non-coherent light; and
    a second source of monochromatic and coherent light; and
    a beam expanding optical system configured to extend and collimate light rays from said second mono-chromatic and coherent light source; and
    a prism configured to add the light rays from said source of mono-chromatic and coherent light and the light rays from said source of white, multi-chromatic and non-coherent light in a light beam.

7. Device according to claim 1, wherein said holographic interference figure is obtained by an infrared sensor.

8. Device according to claim 1, wherein said holographic interference figure is obtained by a sensor whose wavelength is between 300 nanometers and 2000 nanometers.

9. Device according to claim 1, wherein said compressed image is obtained by an infrared sensor.

10. Device according to claim 1, wherein said compressed image is obtained by a sensor whose wavelength is between 300 nanometers and 2000 nanometers.

11. Device according to claim 1, wherein said particularity sought in said sample is the presence of a kind and a species of bacteria in a sample of saliva, of dental tartar sampling, nasal secretions, blood or urine containing a set of bacteria of different kinds and different species.

12. Device according to claim 1, wherein said particularity sought in said sample is the presence of a molecule or of a set of molecules exhibiting a particular transmittance in the light spectrum concerned by the analysis.

13. Device according to claim 1, wherein said desired feature in said sample is the presence of gametes in a sample of sperm.

14. Apparatus according to claim 1, wherein the neural network is further designed to detect a microscopic image of the sample from the hyperspectral holographic image.

15. Method for holographic and hyperspectral measuring and analyzing of a sample, said method comprising:
   an illumination device illuminates said sample; and
   an acquisition device acquires an image containing the spectral and amplitude information of the light signal illuminating said sample; and holographic interference figures of a reference light beam and of a light beam having illuminated said sample containing the amplitude and phase information of the light signal illuminating said sample; and
   a device for reconstructing the hyperspectral holographic image and analyzing the amplitude, phase and spectrum properties of the light illuminating said sample integrates a deep and convolutional neural network architectured to calculate a probability of presence of the particularity sought in said sample from the hyperspectral holographic image, and generate an image for each sought particularity whose value of each pixel at the x and y coordinates corresponds to the probability of presence of said particularity at the same x and y coordinates of said sample.

16. A computer program comprising instructions which cause a processor to perform the method of claim 15.

17. A device according to claim 2 wherein the illuminating beam is passing through the sample.

18. A device according to claim 2 wherein the illuminating beam is reflected by the sample.

19. A device for measuring a sample, said device comprising:
   a capture device for acquiring a compressed image of the sample containing spectral and amplitude information of the light signal illuminating said sample and holographic interference figures of a reference light beam and of a light beam having illuminated said sample containing the amplitude and phase information of the light signal illuminating said sample; and
   an illumination device of said sample; and
   a device for reconstructing a microscopy image of the sample integrating a deep and convolutional neural network architectured to calculate a light intensity in said sample from the compressed image and the holographic interference figure of the beam of reference with the beam illuminating the sample, and generating an image whose value of each pixel at the coordinates u and v corresponds to the light intensity at the x and y coordinates of the plane of said sample; said deep and convolutional neural network being architectured so as to merge the information of the sensors of the diffracted image and of the image of the holographic interference figure.

* * * * *